United States Patent
Haimer et al.

(10) Patent No.: US 11,585,655 B2
(45) Date of Patent: Feb. 21, 2023

(54) COUPLING ELEMENT FOR RECEIVING A PROBE TIP IN A PROBE MEASURING APPARATUS, SCREW INSERT FOR RECEIVING A PROBE TIP IN A PROBE MEASURING APPARATUS, COUPLING ASSEMBLY FOR A PROBE INSERT IN A PROBE MEASURING APPARATUS, AND PROBE MEASURING APPARATUS

(71) Applicant: Haimer GmbH, Igenhausen (DE)

(72) Inventors: Andreas Haimer, Igenhausen (DE); Franz Haimer, Igenhausen (DE); Franz-Josef Haimer, Igenhausen (DE)

(73) Assignee: Haimer GmbH, Igenhausen (DE)

( * ) Notice: Subject to any disclaimer, the term of this patent is extended or adjusted under 35 U.S.C. 154(b) by 94 days.

(21) Appl. No.: 17/323,362

(22) Filed: May 18, 2021

(65) Prior Publication Data

US 2021/0356266 A1  Nov. 18, 2021

(30) Foreign Application Priority Data

May 18, 2020 (DE) .......................... 102020113401.0

(51) Int. Cl.
  *G01B 21/14* (2006.01)
  *G01B 5/016* (2006.01)
(52) U.S. Cl.
  CPC ............. *G01B 21/14* (2013.01); *G01B 5/016* (2013.01)
(58) Field of Classification Search
  CPC .................................. G01B 21/14; G01B 5/016
  USPC ............................................................ 33/503
  See application file for complete search history.

(56) References Cited

U.S. PATENT DOCUMENTS

| 4,078,314 | A | * | 3/1978 | McMurtry | ............... | G01B 7/02 33/832 |
| 4,177,568 | A | * | 12/1979 | Werner | ................ | G01B 11/007 33/561 |
| 4,938,083 | A | * | 7/1990 | Gurny | .................... | G01B 7/012 73/866.5 |
| 5,111,592 | A | * | 5/1992 | Aehnelt | ................. | G01B 7/002 33/561 |
| 5,755,038 | A | * | 5/1998 | McMurtry | ............. | G01B 5/012 33/559 |
| 6,796,050 | B2 | * | 9/2004 | Haimer | ............... | B23B 31/1179 33/639 |
| 7,024,786 | B2 | | 4/2006 | Haimer | | |

(Continued)

FOREIGN PATENT DOCUMENTS

WO   02103282 A1   12/2002

*Primary Examiner* — George B Bennett
(74) *Attorney, Agent, or Firm* — Laurence A. Greenberg; Werner H. Stemer; Ralph E. Locher

(57) ABSTRACT

A coupling element for receiving a probe tip in a probe measuring apparatus has a journal at one end with a first connecting/coupling region. A screw insert has a first connecting/coupling region at one end with a recess, in particular for connecting to the coupling element 16. The journal of the coupling element forms, on an outer surface, or the recess of the screw insert forms, on an inner surface, multiple thread segments or respectively which do not adjoin one another in a radial circumferential direction. A probe measuring apparatus includes the coupling element, the screw insert, a coupling arm/measuring shaft, and a probe insert connected to the coupling arm by way of the coupling element and the screw insert.

30 Claims, 8 Drawing Sheets

(56) References Cited

U.S. PATENT DOCUMENTS

| | | | | |
|---|---|---|---|---|
| 7,086,170 B2* | 8/2006 | Hajdukiewicz | ........ | G01B 5/012 |
| | | | | 33/558 |
| 7,111,410 B2* | 9/2006 | Haimer | .................. | G01B 5/012 |
| | | | | 33/559 |
| 7,296,364 B2* | 11/2007 | Seitz | ...................... | G01B 7/012 |
| | | | | 33/559 |
| 7,392,596 B2* | 7/2008 | Schopf | .................. | G01B 5/016 |
| | | | | 33/559 |
| 7,886,453 B2* | 2/2011 | Ould | .................... | G01B 21/042 |
| | | | | 33/503 |
| 9,459,091 B2* | 10/2016 | Jensen | .................... | G01B 5/016 |
| 2006/0197541 A1* | 9/2006 | Madlener | ............... | G01B 5/012 |
| | | | | 324/755.05 |

* cited by examiner

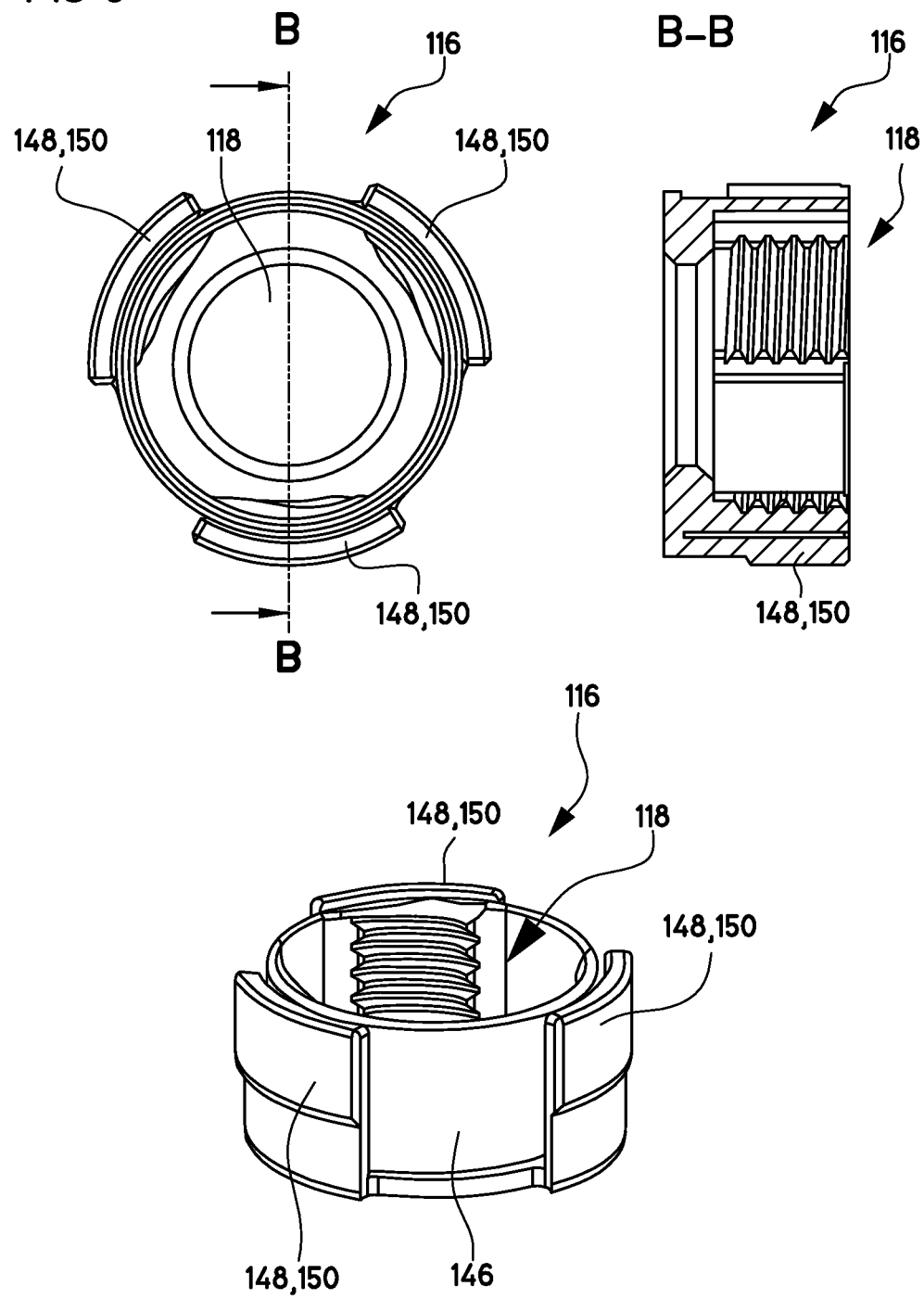

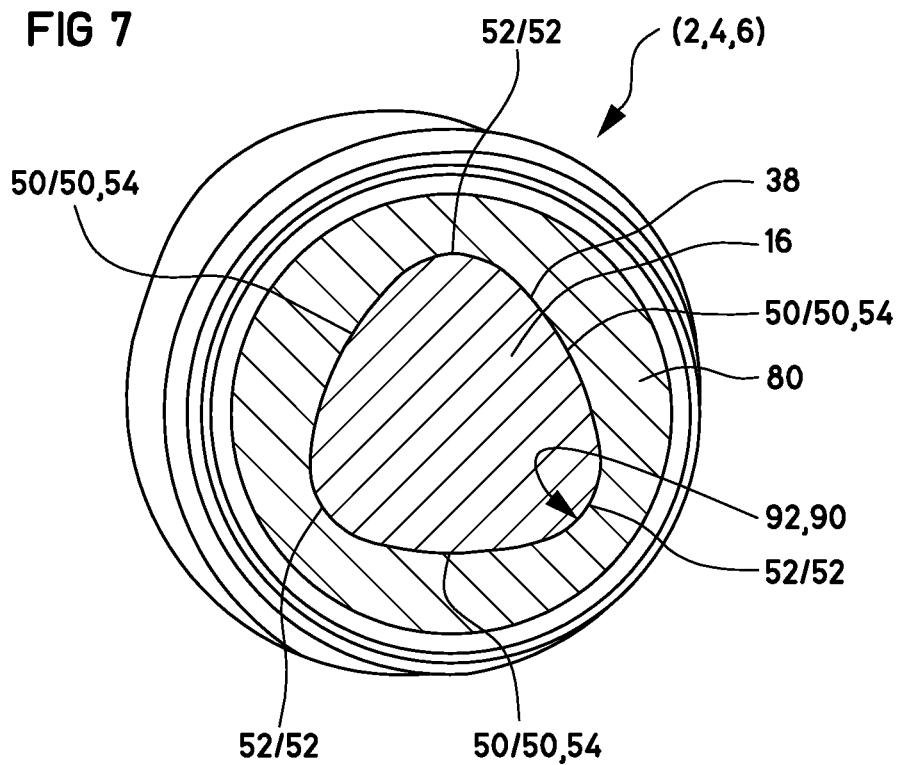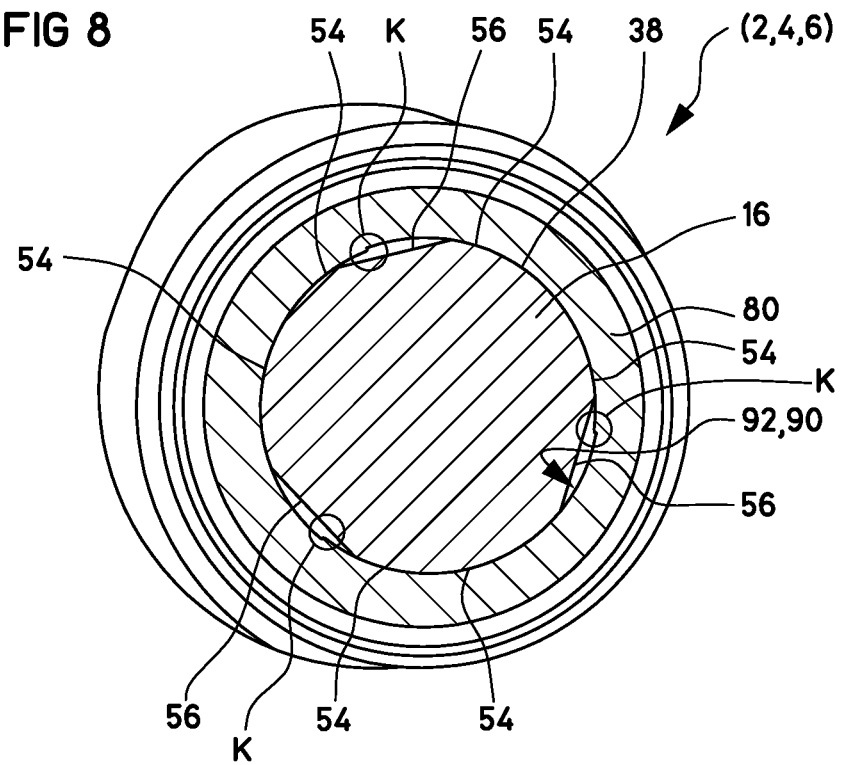

COUPLING ELEMENT FOR RECEIVING A PROBE TIP IN A PROBE MEASURING APPARATUS, SCREW INSERT FOR RECEIVING A PROBE TIP IN A PROBE MEASURING APPARATUS, COUPLING ASSEMBLY FOR A PROBE INSERT IN A PROBE MEASURING APPARATUS, AND PROBE MEASURING APPARATUS

CROSS-REFERENCE TO RELATED APPLICATION

This application claims the priority, under 35 U.S.C. § 119, of German patent application DE 10 2020 113 401.0, filed May 18, 2020; the prior application is herewith incorporated by reference in its entirety.

BACKGROUND OF THE INVENTION

Field of the Invention

The invention relates to a coupling element for receiving a probe tip in a probe measuring apparatus, a screw insert for receiving a probe tip in a probe measuring apparatus, a coupling assembly for a probe insert in a probe measuring apparatus, and one or more probe measuring apparatus-es.

A probe measuring apparatus, for example a multi-coordinate probe measuring apparatus, also referred to merely as 3D probe for short, which allows distance measurements to be performed both in the direction of a measuring axis and transversely with respect thereto, is known for example from our commonly assigned U.S. Pat. No. 7,024,786 B2 (cf. WO 02/103282 A1).

This probe measuring apparatus comprises a housing on which a probe lever, sometimes also referred to as probe arm, is guided so as to be displaceable in the direction of a measuring axis defined by the housing. The probe lever is, by means of a universal joint, for example in this case in the form of a ball joint in U.S. Pat. No. 7,024,786 B2, furthermore guided on the housing so as to be pivotable in all directions about a pivot point situated on the measuring axis, and said probe lever is resiliently preloaded by a resetting spring.

The probe lever has a probe insert which projects out of the housing and which is also often descriptively referred to for short as probe tip, the free probe end of which, formed by a probe ball, defines a probe reference point which lies on the measuring axis when the probe lever is in the rest position.

In relation to the pivot point, a coupling arm of the probe lever, also referred to as measuring shaft of the probe lever, projects, oppositely to the probe insert, into a circular cylindrical guide opening, which is central in relation to the measuring axis, of the housing.

The probe insert, which has not only the probe ball but also a pin, which receives the probe ball, and a sleeve, which is in turn connected to the pin, is screw-connected to the coupling arm by means of a screw connection arrangement which has a centering element and a threaded rod with external thread.

For this purpose, the probe insert, in this case the sleeve of the probe insert, is held, at the other end of the joint ball, in a corresponding bore at that end of the centering element which lies in the direction of the probe insert. At the other end of said bore end, the centering element has an internal thread which is screwed together with the threaded rod or with the external thread of the threaded rod. At that end of the threaded rod which is averted from the probe insert, said threaded rod is screw-connected—by means of an external thread on the threaded rod—in an internal thread of the coupling arm.

A dial gauge held on the housing records the position of the measuring shaft or of the probe lever relative to the housing.

Improper usage of such a probe measuring apparatus during use can result in damage to the probe insert, for example can break in the region of the (ceramic) sleeve, which is composed of ceramic and which serves as a predetermined breaking point, of the probe insert. A replacement or exchange of the probe insert is then necessary.

BRIEF SUMMARY OF THE INVENTION

It is accordingly an object of the invention to provide a coupling which overcomes a variety of disadvantages of the heretofore-known devices and methods of this general type and which provides for a simple, inexpensive and quickly exchangeable coupling of a probe insert in a probe measuring apparatus.

With the above and other objects in view there is provided, in accordance with the invention, a coupling element for receiving a probe tip in a probe measuring apparatus, the coupling element comprising:

a journal having a first connecting and coupling region formed at an end thereof; and said journal having an outer surface formed with a plurality of thread segments which do not adjoin one another in a radial circumferential direction.

With the above and other objects in view there is also provided, in accordance with the invention, a screw insert for receiving a probe tip in a probe measuring apparatus, the screw insert comprising:

a first connecting and coupling region formed at one end and configured for connecting to a coupling element as outlined above;

said first connecting and coupling region having a recess with an inner surface and multiple thread segments formed on said inner surface that do not adjoin one another in a radial circumferential direction.

In other words, the objects of the invention are achieved by way of a coupling element for receiving a probe tip in a probe measuring apparatus, a screw insert for receiving a probe tip in a probe measuring apparatus. There is also provided a coupling assembly for a probe insert in a probe measuring apparatus, and one or more probe measuring apparatuses, having the features of the respective claims. Dependent claims and the following description relate to advantageous refinements of the invention.

Expressions used herein, such as axial and radial, are to be understood—unless explicitly defined otherwise—as being in relation to a measuring axis of a probe measuring apparatus which has the items according to the invention.

The coupling element according to the invention has, at one end, a journal which forms a first connecting/coupling region. The journal forms, on an outer surface, multiple thread segments which do not adjoin one another in a radial circumferential direction.

The screw insert according to the invention (also) has, at one end, a first connecting/coupling region, in particular for connecting to the coupling element,—having a recess, on the inner surface of which there are (likewise) formed multiple thread segments which do not adjoin one another in a radial circumferential direction.

(Such) a thread segment (— be it on the coupling element or on the screw insert —) may in this case be formed by one or more depressions which form in each case one part of a thread turn (partial thread turn) (, wherein, then, "elevations" which delimit such a depression or such a partial thread turn can be regarded—and referred to—as thread flanks).

In simple terms, — in a radial circumferential direction—between the thread segments, there are formed (on the out-er journal surface (in the case of the coupling element) or on the inner recess surface (in the case of the screw insert) thread-free regions or thread-free sections, hereinafter referred to for short and for simplicity as discontinuities, for example substantially smooth partial cylinder surfaces/shells.

That is to say, in descriptive terms, on the journal sur-face or inner surface of the recess respectively, the thread segments (in the case of the journal of the coupling element, in descriptive terms, external thread segments or, in the inner recess of the screw insert, in descriptive terms, internal thread segments) and the thread-free regions or discontinuities alternate in a radial circumferential direction.

This has proven to be advantageous in that it is possible in this way for a corresponding counterpart with respect to the coupling element or with respect to the screw insert, for example the screw insert with respect to the coupling element or vice versa, to be easily and quickly coupled thereto, for example by (quick) rotary coupling, that is to say by axial pushing on/in and then (relative) rotation.

Here, it is the case—during the axial pushing on/in—that the thread segments of one element, for example of the coupling element or the external thread segments of the coupling element, "plunge" into the discontinuities of the other element (counterpart element), for example of the screw insert (or vice versa, that is to say the internal thread segments of the counterpart element, for example of the screw insert, plunge into the discontinuities of the element, for example of the coupling element)—until said elements are then rotated relative to one another—wherein, then, the external thread segments and internal thread segments engage into one another.

In short, the coupling element and screw insert can—by way of this rotary coupling—be easily and quickly coupled—and braced together in a precise manner. The connection—and thus the advantages of the coupling element and/or screw insert—proves to be more stable, better, in particular quicker and free from play and with centering action.

It is furthermore expedient here if the discontinuities—between the thread segments—are radially set back in relation to the thread segments. In descriptive terms, the discontinuities—between the thread segments—lie— in the case of the coupling element—radially further to the inside than the thread segments or lie—in the case of the screw insert—radially further to the outside than the thread segments. The axial insertion (of element and counterpart element) or "plunging-in" (of the thread segments into the discontinuities) can take place more easily.

This rotary coupling can also be further simplified if the thread segments of one element, for example of the coupling element, and the discontinuities of the counterpart element, for example of the screw insert, are adapted to one another in particular in terms of their extent in a circumferential direction. That is to say, if the extent in a circumferential direction of the thread segments (of one element) is equal to or in particular less than the circumferential direction extent of the discontinuities (of the counterpart element), then the element and counterpart element can more easily be axially displaced relative to one another or plunge into one another.

In particular, it is also expedient (— be it in the case of the coupling element or in the case of the screw insert —) if the pitch profiles in the case of all depressions that form the partial thread turns are identical.

In this way, jamming-free coupling of the coupling element or of the screw insert with a corresponding counterpart, for example of the coupling element and the screw insert, can be made possible.

Expressed/explained in simplified or descriptive terms, identical pitch profiles have the result that the same "stroke" is set at/in the case of every partial thread turn. Different strokes can otherwise lead to instances of jamming or can impede a coupling of the coupling element or of the screw insert to a corresponding counterpart.

Here, it is however possible for the—identical—pitch profiles to themselves in turn each be constant—or to vary, in particular to be degressive.

In particular, the degressive configuration of a partial thread turn allows an (initially) quick engagement during a process of coupling of the coupling element or of the screw insert to a corresponding counterpart, for example during the process of rotary coupling (see above).

Furthermore, it may also be provided that (— be it in the case of the coupling element or in the case of the screw insert —) the depressions that form the partial thread turns are formed such that they do not form a common thread turn.

That is to say, expressed in descriptive or simplified terms, all depressions or partial thread turns do not lie on an (imaginary continuous) common helical line.

Furthermore, it may (— be it in the case of the coupling element or in the case of the screw insert —) also be expedient for gaps to be formed between the partial thread turns of a thread segment.

Expressed in descriptive or simplified terms, partial thread turns of a thread segment do not directly adjoin one another in an axial direction, it rather being the case that, between in each case two partial thread turns, there are in each case depressions that are wider than the partial thread turns themselves.

In this way—in the case of coupling of the coupling element or of the screw insert to a corresponding counterpart—the external thread in the case of the coupling element or the internal thread in the case of the screw insert can be more easily brought together with the corresponding in-ternal thread or the corresponding external thread of the counterpart.

In particular, it is expedient from a production aspect if (— be it in the case of the coupling element or in the case of the screw insert —) at least two or more, in particular all, thread segments are of identical form.

Preferably, it may also be provided that three thread segments, which are in particular distributed uniformly in a radial circumferential direction, are arranged on the out-er surface of the journal or on the inner surface of the recess respectively. It is also possible for four or even more thread segments, which are in particular distributed uniformly in a radial circumferential direction, to be provided.

These thread segments may preferably also be arranged at uniform angular intervals.

This may then also apply correspondingly to the discontinuities on the journal or on the inner surface of the recess respectively.

Furthermore, it may also be provided that a recess which has an internal thread is provided in the journal, which forms the first connecting/coupling region, of the coupling element.

This recess may for example be provided for coupling the coupling element—instead of via the thread segments on the journal surface—to another, alternative counterpart, for example a threaded rod, as is provided for example by the 3D probe from U.S. Pat. No. 7,024,786 B2. The "original" coupling facility of the coupling element by way of the thread segments on the journal surface therefore does not need to be dispensed with, and it is—expressed in simplified terms—supplemented by a further coupling facility. The coupling element can thus be used in a versatile manner. That is to say, in descriptive terms, interfaces open or multi-compatible with 3D probes.

Furthermore, a further journal which forms a second connecting/coupling region may be provided on the coupling element—at the other end thereof. This further journal, too, may be formed with a further recess. This further recess may for example serve for receiving a probe tip/a probe insert. For example, said probe insert/probe tip may be screwed and/or adhesively bonded therein.

Provision may thus for example be made for a sleeve of a probe insert to be adhesively bonded in said further recess.

It is also expedient for a radially extending abutment surface for axial planar abutment to be provided on or in the case of the coupling element (also referred to for short merely as planar abutment). This may be oriented in particular in the direction of the journal end of the journal that forms the first connecting/coupling region—and may in particular also be provided for lying on a corresponding surface on a coupling arm/a measuring shaft.

It is also possible for the coupling element to have a substantially cylindrical subsection, on the outer surface of which there is formed a radially outwardly bulged bead, which runs in at least partially, in particular fully, encircling fashion in a radial circumferential direction, for radial centering (also referred to for short merely as centering, for example for centering of the coupling element in a recess in the coupling arm/measuring shaft, in which recess the coupling element is received).

This bead may, in particular after the journal which forms the first connecting/coupling region, be formed on the outer surface of the journal, in particular between planar abutment and the journal that forms the first connecting/coupling region.

Furthermore, it may also be provided that the coupling element provides a subsection, the outer circumference of which is non-circular in cross section. This non-circular configuration may be formed in particular by regions situated radially further to the inside and regions situated radially further to the outside.

Here, geometrical shapes and cross sections that deviate from a circle may be regarded as "non-circular".

Accordingly, it is also expedient if an inner surface of a recess in the coupling arm/measuring shaft, in which recess the coupling element can be or is received, is of complementary form with respect to the non-circular con-figuration, in particular also has regions situated radially further to the inside and radially further to the outside.

It is thus then possible, if the coupling element is to be received in the coupling arm/measuring shaft, for said coupling element to be pushed into the recess thereof and then rotated—relative to the coupling arm/measuring shaft. Here, if the regions, situated radially further to the outside, of the coupling element or in/of the subsection of the coupling element abut against the regions, situated radially further to the inside, of the coupling arm/measuring shaft or in the recess of the coupling arm/measuring shaft or on the inner surface of the recess of the coupling arm/measuring shaft, then the coupling element and the coupling arm/measuring shaft (that is to say the play is obtained from the pairing) are braced relative to one another—and can thus also be centered relative to one another.

It may also be advantageous if the screw insert, at the other end, has a journal which forms a second connecting/coupling region and on the outer surface of which there is formed an external thread, or if the screw insert, at the other end, has a bore which forms the second connecting/coupling region 120 and which has an inserted (hexagonal socket) screw.

By means of this external thread or this screw or the (external) thread thereof, it is for example possible for the screw insert to be screwed together with an internal thread provided on the coupling arm.

Also, in the case of the screw insert, a reduced-diameter, substantially cylindrical intermediate region may be provided between the first and the second connecting/coupling region. By means of this, the screw insert can have a certain degree of flexibility—in order to be able to compensate possibly occurring tolerances.

Axial planar abutment and/or centering may also be provided in the case of the screw insert. That is to say, in other words, it may be provided that the screw insert has a radially extending abutment surface for axial planar abutment or a substantially cylindrical subsection for radial centering (for example for centering of the screw insert in a recess in the coupling arm/measuring shaft, in which recess the screw insert is received)—both in particular for abutment and/or centering relative to the measuring shaft/the coupling arm.

In a refinement, it is also possible for a radially resilient structure to be provided on an outer surface of the screw insert, in particular in the region of the first connecting/coupling region.

It may furthermore be expedient here, because it is simple in terms of manufacturing, if the axially resilient structure is formed by means of spring clamp elements ("clip").

Accordingly, it may then also be expedient if, on an inner surface of a recess in the coupling arm/measuring shaft, in which recess the screw insert can be or is received, there is formed a (detent engagement) structure in which said radially resilient structure on/of the screw insert can be engaged with detent action.

It may furthermore be expedient here, because it is simple in terms of manufacturing, if the (detent engagement) structure is formed by a radially encircling groove on the inner surface of the recess in the coupling arm/measuring shaft.

By means of these simple structural elements—of axially resilient structure of the screw insert and/or (detent engagement) structure of the coupling arm/measuring shaft—it is thus possible for the screw insert to be received and held securely in the coupling arm/measuring shaft in a simple manner.

It is possibly also expedient here for the screw insert to be formed with a means for securing against rotation relative to the coupling arm/measuring shaft.

The coupling assembly according to the invention provides the coupling element and the screw insert. Both may in particular be formed with the described configurations.

It is particularly expedient here if the thread segments of the coupling element and the thread segments of the screw insert are formed as corresponding internal/external threads that can be screwed together (see above with regard to the rotary coupling).

The respective discontinuities in the case of the coupling element and screw insert may also be adapted to one another (see above with regard to the rotary coupling).

The connection of coupling element and screw insert is then performed in particular by—quick—rotary coupling (see above), that is to say by axial insertion of the coupling element into the screw insert and then—mutual—(relative) rotation.

It is thus also particularly expedient for the coupling element and/or the screw insert or the coupling assembly to be used for receiving a probe tip in a probe measuring apparatus, in particular a 3D probe, it is thus possible for the probe tip to be easily and quickly installed (in the probe measuring apparatus) or exchanged (in the case thereof).

A probe measuring apparatus according to the invention provides (at least) the screw insert, in particular according to described configurations, and a coupling arm/measuring shaft, wherein the screw insert and the coupling arm/measuring shaft are connected to one another, in particular are screwed together or are formed as a single piece.

In particular, this connection of screw insert and coupling arm/measuring shaft may be realized by virtue of screw insert having, at the other end, the journal which forms the second connecting/coupling region and on the outer surface of which the external thread is formed, and the coupling arm providing the provided internal thread. The external thread of the screw insert and the internal thread of the coupling arm can then be screwed together.

A further probe measuring apparatus according to the invention may also have the coupling element, in particular according to described configurations, a screw insert, in particular according to described configurations, a probe insert, in particular a probe insert which has a probe ball, a pin and a sleeve, and a coupling arm/measuring shaft, wherein the probe insert is connected to the coupling arm/measuring shaft by means of the coupling element and by means of the screw insert connected to the coupling element.

Furthermore, in the case of the probe measuring apparatus, it may also be provided that the thread segments of the coupling element and the thread segments of the screw insert are formed as corresponding internal/external threads that can be screwed together.

The respective discontinuities may also be adapted to one another, such that the coupling element and the screw insert can be connected to one another by rotary coupling (see above).

As an alternative to the coupling element according to the invention which has the thread segments, it is also possible for a (further) coupling element to be provided which, at one end, has a journal which forms a first connecting/coupling region and on the outer surface of which there is formed (instead of the (multiple) thread segments (spaced apart by the discontinuities) a (continuous or uninterrupted) multi-turn external thread.

This alternative coupling element may also be refined with described refinements of the above-described coupling element which has the thread segments, such as in particular the recess with internal thread or the further recess with the further internal thread, the planar abutment or the centering means.

An advantage in the case of this alternative coupling element which has the multi-turn thread is in particular that, with such a coupling element, if it is screw-connected by means of said multi-turn thread, for example in a probe measuring apparatus, a greater axial feed/stroke can be realized for the same rotational angle (in relation to single-turn threads), whereby said coupling element can be screw-connected—more quickly than a part which has a conventional single-turn thread.

If the connection of a probe insert is then realized by means of such an alternative coupling element, which has the multi-turn thread, in the case of/in a probe measuring apparatus, a probe insert can thus be changed or exchanged in a short(er) time.

The above description of advantageous configurations of the invention contains numerous features that are in some cases depicted together in combination in the individual subclaims. These features may however expediently also be considered individually and combined to form further meaningful combinations.

Even if some terms have been used in each case in the singular or in conjunction with a numeral in the description or in the patent claims, the scope of the invention is not intended to be restricted to the singular or to the respective numeral for said terms. Furthermore, the words "a" or "an" are to be understood not as numerals but as indefinite articles.

Other features which are considered as characteristic for the invention are set forth in the appended claims.

The above-described characteristics, features and advantages of the invention, and the manner in which these are achieved, will become clearer and more distinctly understandable in conjunction with the following description of the exemplary embodiments of the invention, which will be discussed in more detail in conjunction with the drawing figures.

The exemplary embodiments serve for the explanation of the invention and do not restrict the invention to the combinations of features, including functional features, specified therein. Furthermore, for this purpose, suitable features of each exemplary embodiment may also explicitly be considered in isolation, taken from one exemplary embodiment, introduced into another exemplary embodiment in order to supplement the latter, and/or combined with any of the claims.

BRIEF DESCRIPTION OF THE SEVERAL VIEWS OF THE DRAWING

FIG. 6 shows three different views of a screw insert of a probe lever of a probe measuring apparatus according to a further embodiment of the invention;

FIG. 7 shows a section in the case of a probe lever with coupling element, with bracing capability, of a probe measuring apparatus according to a yet further embodiment of the invention;

FIG. 8 shows a section in the case of a probe lever with coupling element, with bracing capability, of a probe measuring apparatus according to a yet further embodiment of the invention;

Identical parts/components and respective functions are denoted by the same reference designations throughout the drawing.

DETAILED DESCRIPTION OF THE INVENTION

Figure 1:
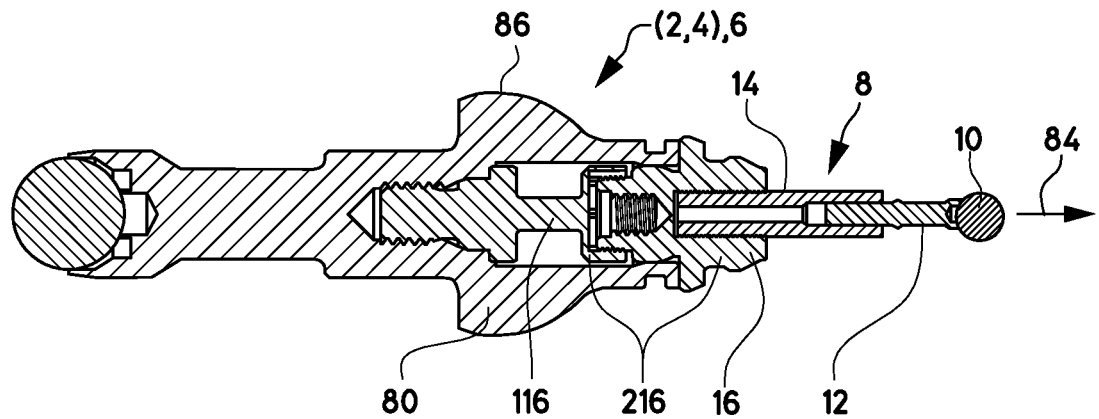
FIG. 1 shows a probe lever with a probe insert, a coupling element, a screw insert and a coupling arm/measuring shaft of a probe measuring apparatus according to an embodiment of the invention.

The first portion of the following description relates to FIGS. 1-4 and pertains to a 3D probe insert/tip 8 with rotary coupling for a 3D probe 2.

Expressions used here, such as axial and radial, are to be understood—unless explicitly defined otherwise—as being in relation to the measuring axis 82 of the 3D probe 2.

The 3D probe 2 comprises a housing 4 (not illustrated in the figures) on which a probe lever 6 (cf. FIG. 1, FIG. 4) is guided displaceably in the direction of a measuring axis 82 defined by the housing 4.

The probe lever 6 is, by means of a universal joint 86, in this case in the form of a ball joint 86, furthermore guided on the housing 4 so as to be pivotable in all directions about a pivot point situated on the measuring ax-is 82, and said probe lever is resiliently preloaded by a resetting spring (not illustrated in the figures).

Figure 4:
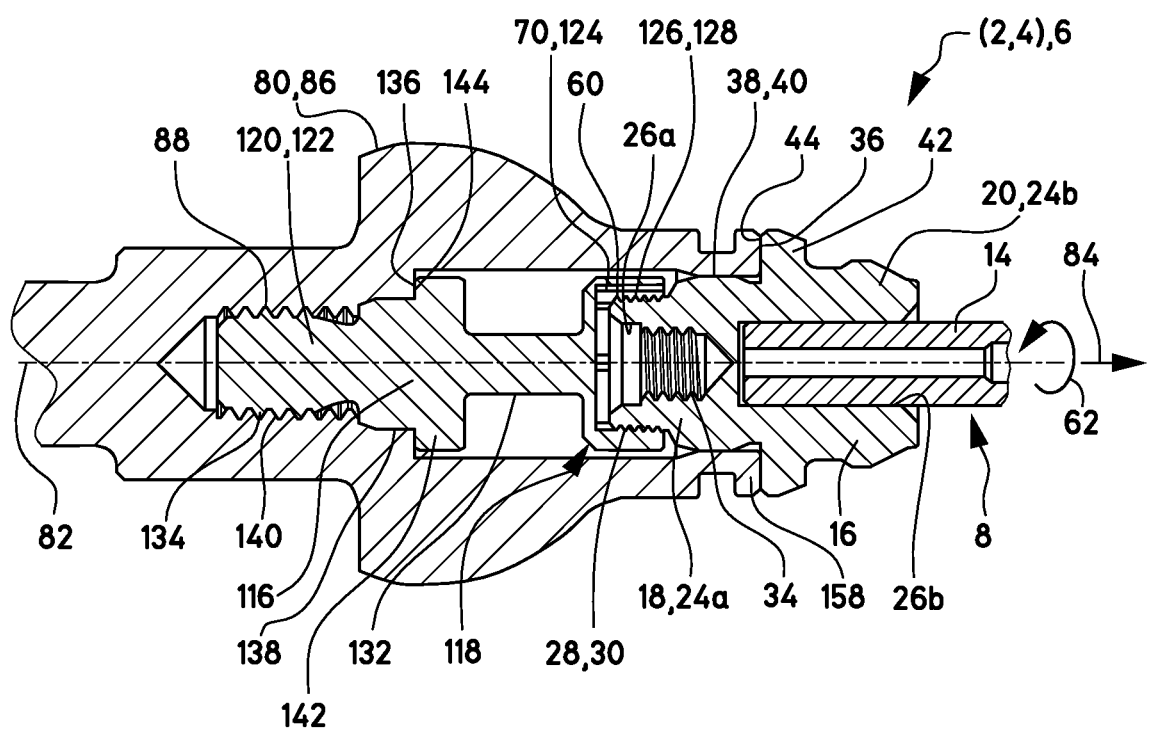
FIG. 4 shows a section of a probe lever with a probe insert, a coupling element, a screw insert and a coupling arm/measuring shaft of a probe measuring apparatus according to an embodiment of the invention.

The probe lever 6 has, as shown in FIGS. 1 and 4, a probe insert/probe tip 8 which projects out of the housing and the free probe end of which, formed by a probe ball 10, defines a probe reference point which lies on the measuring axis 82 when the probe lever 6 is in the rest position.

As illustrated in FIGS. 1 and 4, the probe lever 6 furthermore comprises a coupling arm 80 which—in relation to the pivot point—projects, oppositely to the probe insert 8 or oppositely to the direction 84 to the probe tip 8, into a circular cylindrical guide opening, which is central in relation to the measuring axis 82, of the housing 4 (not illustrated in the figures).

By means of a coupling assembly 216, which has a coupling element 16 (cf. FIG. 2) and a screw insert 116 (cf. FIG. 3) connected to the coupling element 16, as illustrated in FIGS. 1 and 4, the probe insert 8, which aside from the probe ball 10 has a (steel) pin 12, which receives the probe ball 10 by means of a welded connection, and a (ceramic) sleeve 14, which is in turn connected to the pin 12, is screwed to the coupling arm 80.

Figure 2:
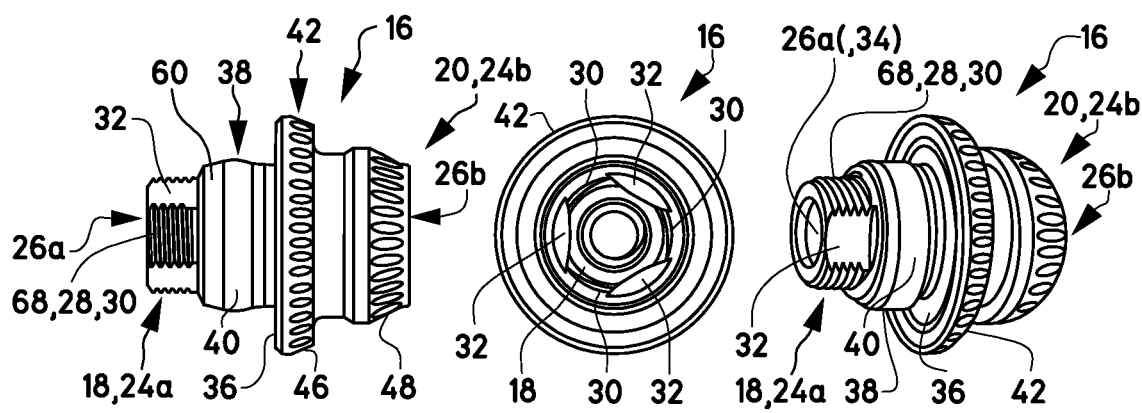
FIG. 2 shows three differently rotated views of a coupling element of a probe lever of a probe measuring apparatus according to an embodiment of the invention.

For this purpose, as described in more detail in conjunction with FIG. 2, the (installed) coupling element 16 (then) provides, at its end pointing in the direction 84 of the probe tip 8, a recess (26b) in the form of an axial bore which is open at one side (at the end side) and which serves for receiving the sleeve 14 of the probe insert 8.

As shown in FIG. 2 (in views 2-1, 2-2, 2-3, detail view of the coupling element 16), the coupling element 16 has, at one end, a journal (24a) which forms a first connecting/coupling region 18.

This journal (24a) forms, on an outer surface 60, multiple, in this case three, thread segments 28 which do not adjoin one another in a radial circumferential direction 62 and which are arranged so as to be distributed uniformly in a radial circumferential direction 62 and which are identical in themselves and which are in the form of external thread components 30, the partial thread turns 30 of which all have the same, slightly degressive pitch profile 68 or, for short, the same slightly degressive pitch 68.

That is to say that, as shown in FIG. 2, in a radial circumferential direction 62, between the three thread segments 28 (on the outer journal surface 60 in the case of the coupling element 16), there are formed three thread-free regions or thread-free sections, which are thus likewise arranged so as to be distributed uniformly in a radial circumferential direction 62 (so as to alternate with the thread segments 28), and which are hereinafter referred to for short and for simplicity as discontinuities 32 and which are in this case in the form of smooth partial cylinder surfaces/shells.

Here, as can also be seen from FIG. 2, the three discontinuities 32 are, in a radial circumferential direction 62, in each case somewhat longer than the three thread segments 28—and, as is also illustrated in FIG. 2, are formed so as to be situated radially further to the in-side, or radially set back, in relation to the thread segments 28.

Furthermore, as shown in FIG. 2, the journal (24a), which bears the external thread components 30, of the coupling element 16 has an axial recess (26a), in the form of an axial bore which is open at one side (at the end side) and in which an internal thread 34 is provided.

Furthermore, as illustrated in FIG. 2, a further journal 24b, which forms a second connecting/coupling region 20, is provided on the coupling element 16—there at the other end of the journal (24a) that bears the thread segments 28 or the external thread components 30.

Said further journal 24b also provides a recess (26b) in the form of an axial bore which is open at one side (at the end side) and which serves (as shown in FIGS. 1 and 4) for receiving the sleeve 14 of the probe insert 8. That is to say, the sleeve 14 of the probe insert 8 is adhesively bonded in this recess (26b).

Furthermore, as shown in FIG. 2, on the coupling element 16, a radially extending abutment surface 36 which is directed in the direction of the journal (24a) that bears the thread segments 28 or the external thread components 30 is provided—on a radially outwardly extending flange-like projection 42—for axial planar abutment against a counterpart surface 44 on the coupling arm 80 (also referred to for short merely as planar abutment).

As is also shown in FIG. 2, the flange-like projection 42 provides, on its outer circumferential surface, a fluting 46 in order that it can be more easily gripped. A corresponding fluting 48 is also formed on the outer circumference of the further journal 24b (there also in order that it can be more easily gripped).

Furthermore, the coupling element 16 provides—axially between the journal (24a), which bears the thread segments 28 and the external thread components 30, and the flange-like projection 42 that provides the planar abutment—a substantially cylindrical subsection 38, on the outer sur-face of which there is formed a radially outwardly bulged bead 40 which runs in encircling fashion in a radial circumferential direction and which serves for radial centering of the coupling element 16 in the coupling arm 80 (cf. FIGS. 1 and 4) (also referred to for short merely as centering).

Figure 3:
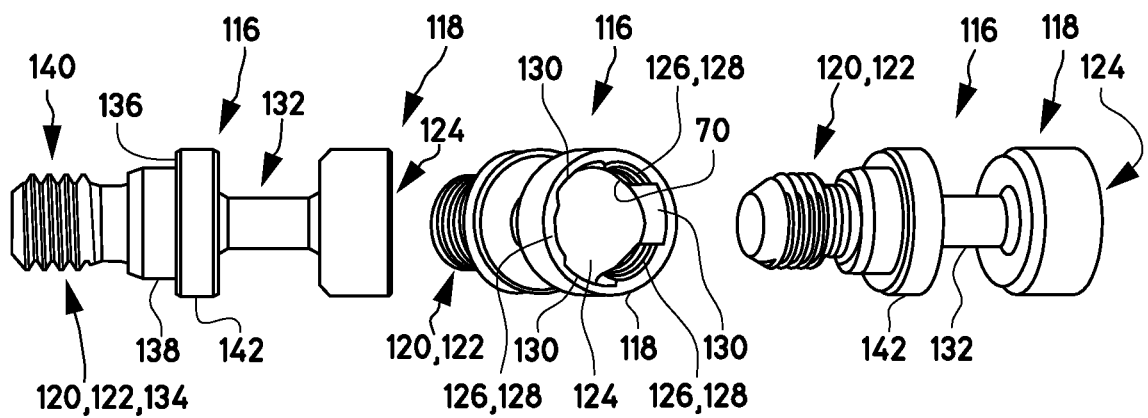
FIG. 3 shows three differently rotated views of a screw insert of a probe lever of a probe measuring apparatus according to an embodiment of the invention.

FIG. 3 shows the screw insert 116 in detail. As shown in FIG. 3, the screw insert 116 likewise provides, at one end, a first connecting/coupling region 118.

This first connecting/coupling region 118 has an axial recess 124, in the form of an axial bore which is open at one side (at the end side) and on the inner surface 70 of which there are formed multiple, in this case three, thread segments 126 which do not adjoin one another in a radial circumferential direction 62 and which are arranged so as to be distributed uniformly in a radial circumferential direction 62 and which are identical in themselves and which are in the form of internal thread components 128, the partial thread turns 128 of which all have the same, slightly degressive pitch profile 68 or, for short, the same slightly degressive pitch 68.

That is to say that, as shown in FIG. 3, in a radial circumferential direction 62, between the three thread segments 126 (on the inner recess surface 70 in the case of the screw insert 116), there are formed three thread-free regions or thread-free sections, which are thus like-wise arranged so as to be distributed uniformly in a radial circumferential direction 62 (so as to alternate with the thread segments 126), and which are hereinafter again referred to for short and for simplicity as discontinuities 130 and which are in this case in the form of smooth partial cylinder surfaces/shells.

Here, as can also be seen from FIG. 3, the three discontinuities 130 are, in a radial circumferential direction 62, in each case somewhat longer than the three thread segments 126—and, as is also illustrated in FIG. 3, are situated radially further to the outside, or radially set back, in relation to the thread segments 126.

In short, the first connecting/coupling region 118 of the screw insert 116 is formed as a complementary, couplable counterpart/counter-element in relation to the first connecting/coupling region 18 of the coupling element 16—or—the recess 124, which bears the thread segments 126—of the screw insert 116 is formed as a complementary, couplable counterpart/counter-element in relation to the journal (24a), which bears the thread segments 28, of the coupling element 16.

By means of these complementary elements, it is possible, as will be described, for the coupling element 16 and the screw insert 116 to be connected to one another easily and quickly—by rotary coupling.

Furthermore, as illustrated in FIG. 3, a journal 122, which forms a second connecting/coupling region 120, is provided on the screw insert 116—there at the other end of the recess 124 that bears the thread segments 126 or the internal thread components 128.

On the outer surface 140 of the journal 122, there is pro-vided an external thread 134 by means of which the screw insert 116 can be screwed into the coupling arm 80 (into an internal thread 88 thereof) (cf. FIGS. 1 and 4).

Furthermore, as shown in FIG. 3 (and illustrated in FIG. 4),—similarly to the coupling element 16—on the screw insert 116, there is provided—on a radially outwardly extending flange-like projection 142—a radially extending abutment surface 136 which is directed in the direction of the journal 122 that bears the external thread 134, which abutment surface serves for axial abutment against a counterpart surface 144 on the coupling arm 80.

Furthermore, the screw insert 116 provides—axially between the journal 122 that bears the external thread 134 and the flange-like projection 142 that provides the abutment—a substantially cylindrical subsection 138 for ra-dial centering in the coupling arm 80.

As is also shown in FIG. 3, the screw insert 116 furthermore also has a reduced-diameter, substantially cylindrical intermediate region 132—axially between the first and the second connecting/coupling region 118, 120 or axially between the flange-like projection 142 and the first connecting/coupling region 118 of the screw insert 116—, whereby the screw insert 116 can have a certain flexibility in order to be able to compensate possibly occurring tolerances.

The installation of the probe insert 8 may be performed in the screw insert 116 that is screwed into the coupling arm 80.

For this purpose, the screw insert 116 can be screwed by way of the external thread 134, provided on the outer journal surface 140, into the coupling arm 80 (into an in-ternal thread 88 thereof) (cf. FIGS. 1 and 4).

For the fixing of the probe insert 8, which is connected by way of its sleeve 14 to the coupling element 16, to/on the coupling arm 80 (cf. FIGS. 1 and 4), the journal (24a), which has the thread segments 28 with the external thread components 30, of the coupling element 16 is then axially introduced/pushed into the recess 124, which has the thread segments 126 with the internal thread components 128, of the screw insert 116 (specifically until the axial planar abutment surface 36 abuts against the counterpart surface 44 of the coupling arm 80), wherein the thread segments 28 of the coupling element 16 plunge into the discontinuities 130 of the screw insert 116 (or vice versa (32/126),—and are then braced by "relative rotation" (here, it is then the case that the external and in-ternal thread components 30, 128 of the thread segments 28, 126 engage into one another)—and thus coupled or held/fixed (rotary coupling).

This push-turn sequence—that is to be performed during the installation of the probe insert 8 into the 3D probe 2—or the rotary coupling of coupling element 16 and screw insert 116 does not require any laborious screw connection operation such as is required in the case of the 3D probe from WO 02/103282 A1—with its centering element and threaded rod—and thus allows an easy and quick exchange or quick and easy installation of the probe insert 8 in the 3D probe 2.

Figure 5:
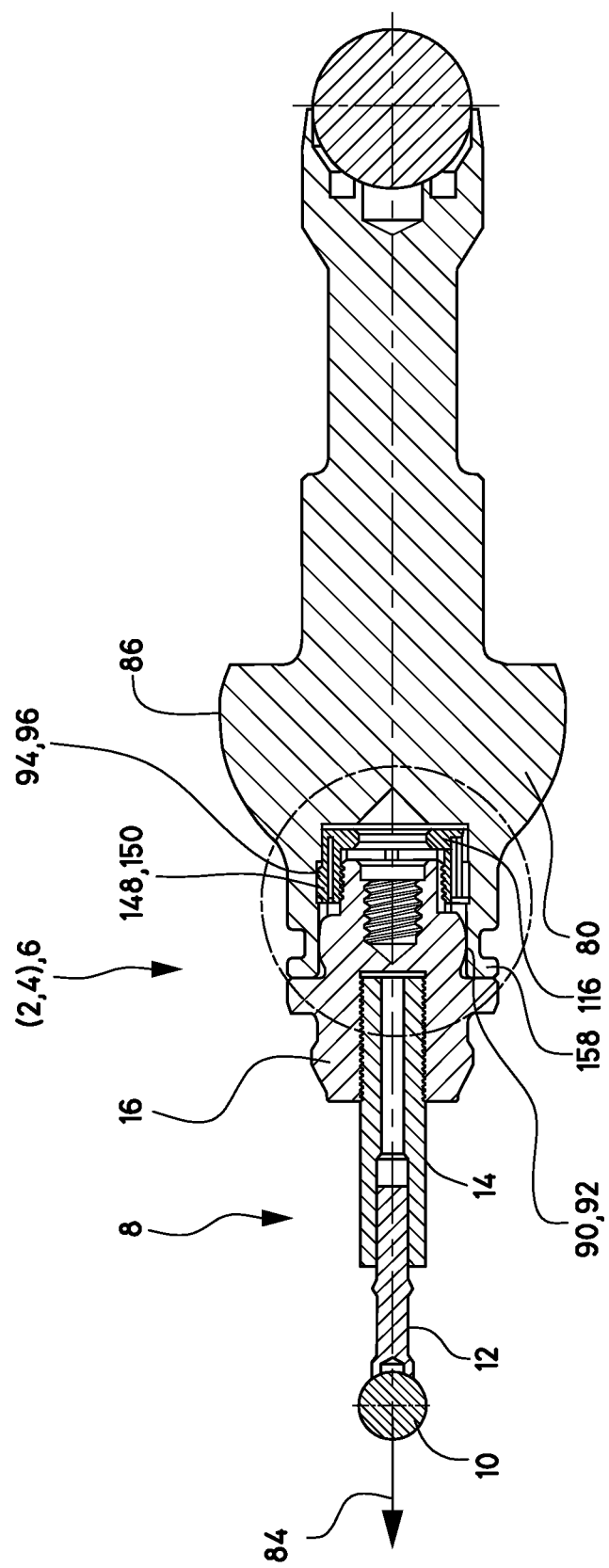
FIG. 5 shows a probe lever with a probe insert, a coupling element, a screw insert and a coupling arm/measuring shaft of a probe measuring apparatus according to a further embodiment of the invention.

The following description, which relates specifically to FIGS. 5-6 pertains to a 3D probe insert/tip 8 with rotary coupling for a 3D probe 2 with screw insert 116 as "clip."

Again, expressions used here, such as axial and radial, are to be understood—unless explicitly defined otherwise—as being in relation to the measuring axis 82 of the 3D probe 2.

FIG. 5 shows a probe lever 6 of a 3D probe 2 with a probe insert 8, a coupling element 16, a coupling arm/measuring shaft 80 and an—alternative—screw insert 116.

FIG. 6 (in the three differently rotated views) shows this alternative screw insert 116 in detail.

The probe insert 8 and the coupling element 16 are of identical form in relation to the embodiment described above (according to FIGS. 1 to 4); the coupling arm/measuring shaft 80 and the screw insert 116 also substantially correspond to the above-described embodiment, in particular as regards the rotary coupling of coupling element 16 and screw insert 116.

The embodiment of the probe lever described below (according to FIGS. 5 to 6) has differences—in relation to the above-described probe lever 6 (according to FIGS. 1 to 4)—"only" with regard to the retention of the screw insert 16 in the coupling arm/measuring shaft 80.

Owing to the substantial correspondence of the two embodiments, the description of identical elements in both embodiments will be omitted for the sake of simplicity here (below)—and, in this regard, reference will be made to the statements relating to the embodiment described above. In particular, identical parts/components and functions are denoted by the same reference designations in the drawing figures.

As shown in FIGS. 5 and 6, the alternative screw insert 116 provides a radially resilient structure 148 on the outer surface 146 of the screw insert 116, which structure is formed there in the region of the first connecting/coupling region 118.

Here, as illustrated in FIG. 6 in particular, said axially resilient structure 148 is formed by means of—in this case three—spring clamp elements 150 ("clip").

As is also then shown in FIG. 5, on the inner surface 92 of the recess 90 in the coupling arm/measuring shaft 80, in which recess the screw insert 116 is received, there is formed a (detent engagement) structure 94—in this case in the form of a radially encircling groove 96 on the inner surface 92 of the recess 90 in the coupling arm/measuring shaft 80—in which groove 96 said radially resilient structure 148 or the spring clamp elements 150 can engage with detent action.

By means of these simple structural elements—of radially resilient structure 148 or spring clamp elements 150 of the screw insert 116 and (detent engagement) structure 94 or groove 96 of the coupling arm/measuring shaft 80—it is thus possible for the screw insert 116 to be received and held securely in the coupling arm/measuring shaft 80 in a simple manner.

The following description relates specifically to FIGS. 7-8 and pertains to a 3D probe insert/tip 8 with coupling elements 16 braced in the coupling arm/measuring shaft 80.

Once more, expressions used here, such as axial and radial, are to be understood—unless explicitly defined otherwise—as being in relation to the measuring axis 82 of the 3D probe 2.

FIGS. 7 and 8 show—in sectional illustrations—embodiments of above-described coupling elements 16 (received in the coupling arm/measuring shaft 80) which furthermore provide bracing by means of their surfaces in the coupling arm/measuring shaft 80 or in the recess 90 of the coupling arm/measuring shaft 80 (said coupling elements 16, like the coupling arms/measuring shafts 80 that receive them, may be or are otherwise designed in accordance with the embodiments described above).

For this purpose, as illustrated in FIGS. 7 and 8, such coupling elements 16 have a subsection 38, the outer circumference of which is of non-circular cross section. This non-circular con Figuration is, as shown in FIGS. 7 and 8 (in both cases), formed by regions 50, 52 situated radially further to the inside and radially further to the out-side.

This "non-circular" subregion 38 is in this case arranged on the respective coupling element (as per FIG. 7 and FIG. 8) between the planar abutment 36 and the journal (24*a*) which forms the first connecting/coupling region 18 (cf. for example FIG. 2).

FIG. 7 shows a coupling element 16 in the case of which—to form the non-circularity or the regions 50, 52 situated radially further to the inside and radially further to the outside—the outer circumference of the subregion 38 has, in cross section, three circular arcs 54 which are connected to one another and which are "relatively flat", that is to say whose radii of curvature are greater than half of the circle diameter.

FIG. 8 shows a similar coupling element 16, in the case of which the outer circumference of the subregion 38 in cross section connects three circular arcs 54 (of a common circle, that is to say with equal radius) via straight chords 56 respectively situated in between.

Correspondingly to these "non-circular" subregions 38 of the coupling elements 16, correspondingly complementary "non-circular" structures are formed on the inner surfaces 92 of the recesses 90 in the coupling arms/measuring shafts 80. That is to say that, in that case, too, these have regions 50, 52 situated radially further to the in-side and radially further to the outside.

FIG. 7 shows a coupling arm/measuring shaft 80, the recess 90 of which has, on the inner surface 92 thereof in cross section—in somewhat larger form (in relation to the subregion 38 of the coupling element 16)—three interconnected "relatively flat" circular arcs 54 (, such that—in the case of a "concentric" arrangement/orientation of coupling arm/measuring shaft 80 and coupling element 16—a degree of play (required for the relative rotation (bracing) forms/can form between coupling arm/measuring shaft 80 and coupling element 16).

FIG. 8 shows a coupling arm/measuring shaft 80, the recess 90 of which has, on its inner surface 92 in cross section, three interconnected circular arcs 54—three ra-dii of identical circles with offset central points (starting points of the circular arcs 54 marked by circles K).

In both cases according to FIGS. 7 and 8, it is thus the case that regions 50, 52 situated radially further to the inside and radially further to the outside form—on the outer surface of the subsection 38 of the respective coupling element 16 and on the inner surface 92 of the recess 90 of the respective coupling arm/measuring shaft 80.

It is thus then possible, if the coupling element 16 is to be received in the coupling arm/measuring shaft 80, for said coupling element to be pushed into the recess 90 thereof and then rotated—relative to the coupling arm/measuring shaft 80. Here, if the regions 50, 52, situated radially further to the outside, of the coupling element 16 or in/of the subsection 38 of the coupling element 16 abut against the regions 50, 52, situated radially further to the inside, of the coupling arm/measuring shaft 80 or in the recess 90 of the coupling arm/measuring shaft 80 or on the inner surface 92 of the recess 90 of the coupling arm/measuring shaft 80, then the coupling element 16 and the coupling arm/measuring shaft 80 are braced relative to one another.

Figure 9:
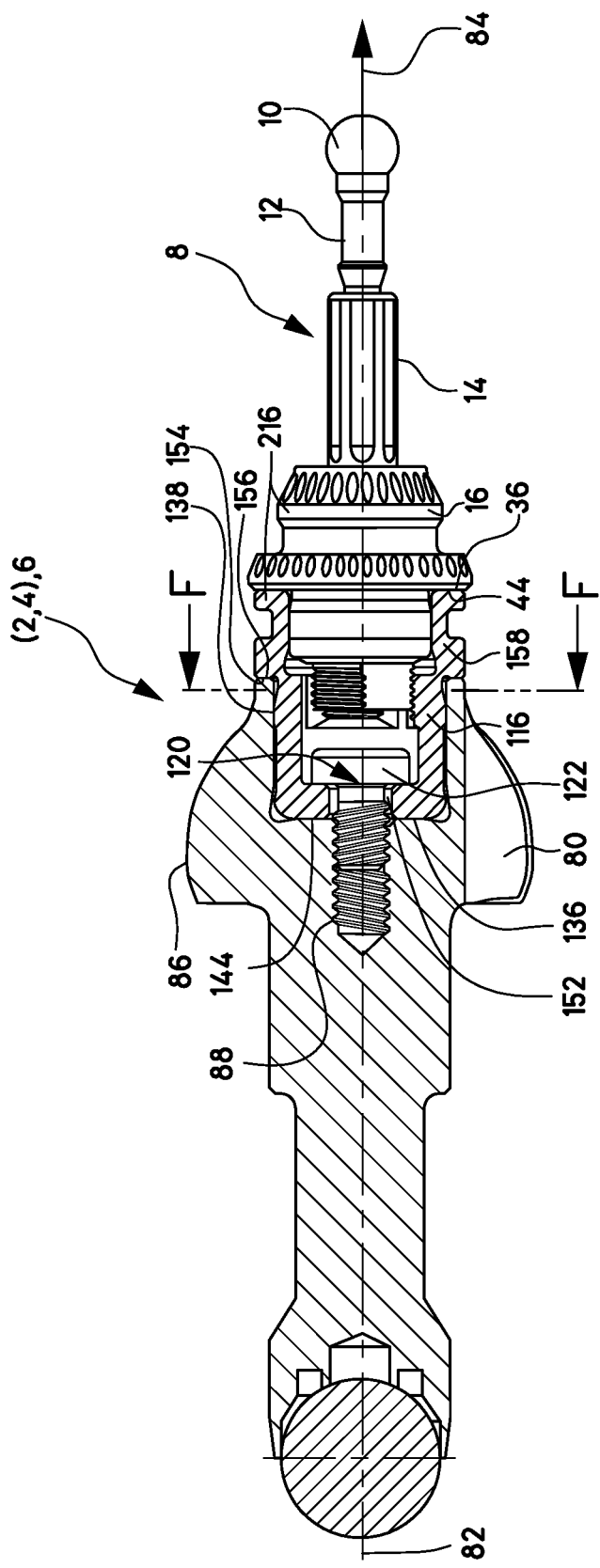
FIG. 9 shows a probe lever with a probe insert, a coupling element, a screw insert and a coupling arm/measuring shaft of a probe measuring apparatus according to a yet further embodiment of the invention.
Figure 10:
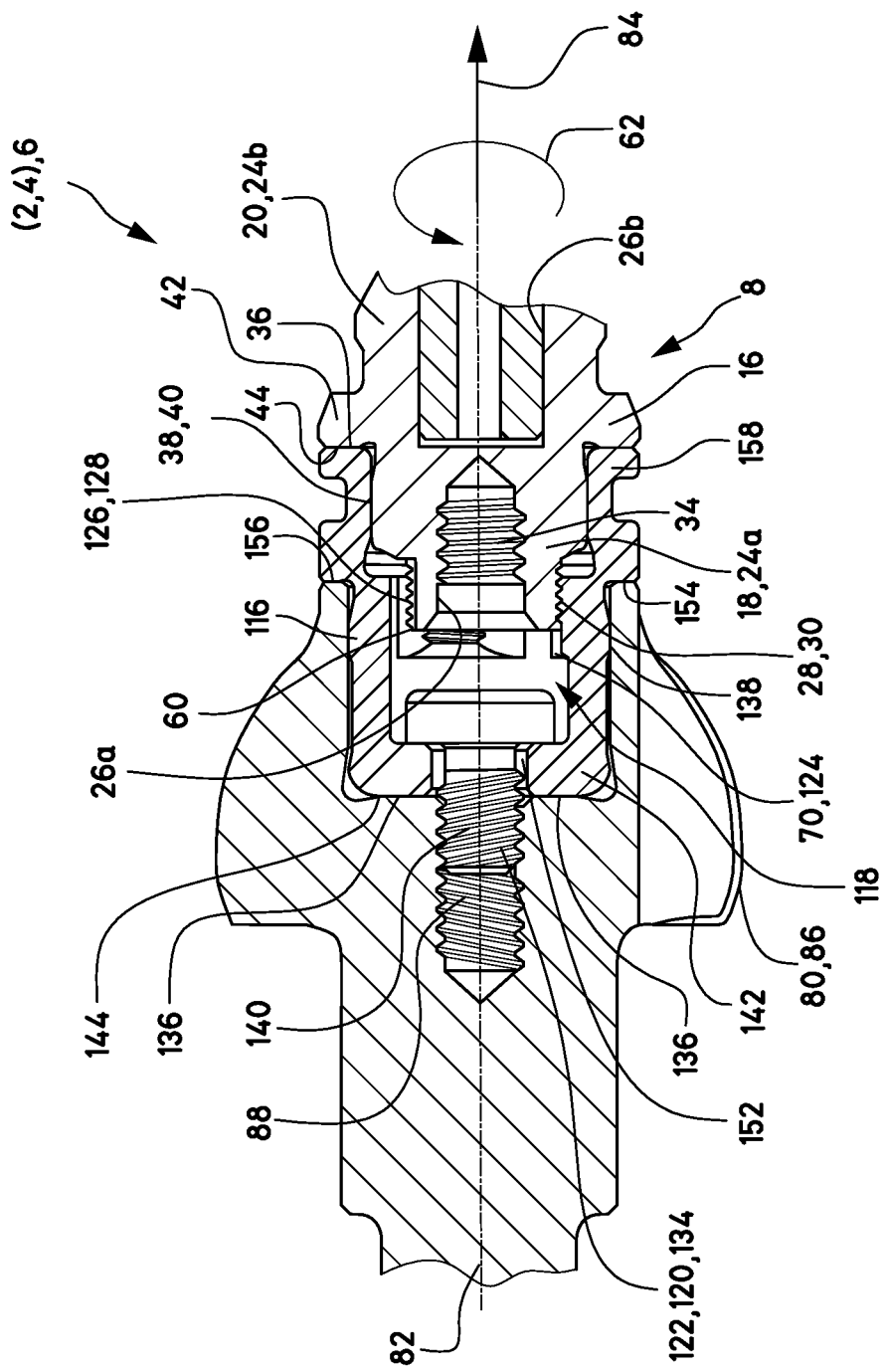
FIG. 10 shows a detail view of the coupling element, the screw insert and the coupling arm/measuring shaft of the probe measuring apparatus according to the yet further embodiment of the invention.
Figure 11:
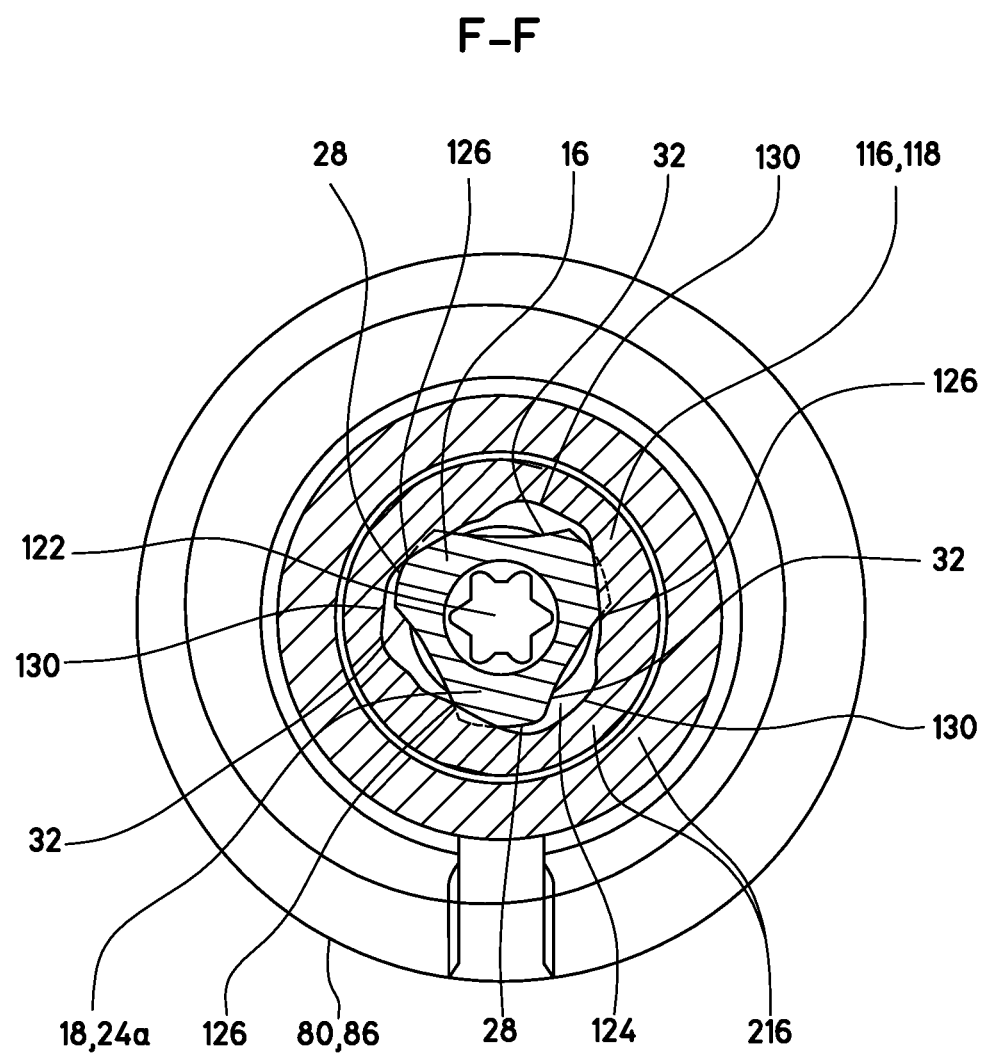
FIG. 11 shows a section through the probe measuring apparatus, taken along the line F-F in FIG. 9, according to the yet further embodiment of the invention.

The following description refers specifically to FIGS. 9-11 and pertains to a 3D probe insert/tip 8 with rotary coupling for a 3D probe 2.

Needless to say, expressions used here, such as axial and radial, are to be understood—unless explicitly defined otherwise—as being in relation to the measuring axis 82 of the 3D probe 2.

FIG. 9 shows a probe lever 6 of a 3D probe 2 with a probe insert 8, a coupling element 16, a,—alternative (slightly modified)—coupling arm/measuring shaft 80 and an—alternative (slightly modified)—screw insert 116.

FIG. 10 shows a detail of said 3D probe 2 with alternative screw insert 116.

FIG. 11 shows a section—along the section line denoted by F-F in FIG. 9 in the case of said 3D probe 2 with alternative screw insert 116.

The probe insert 8 and the coupling element 16 are of identical form in relation to the embodiment described above (according to FIGS. 1 to 4); the coupling arm/measuring shaft 80 and the screw insert 116 also substantially correspond to the above-described embodiment, in particular as regards the rotary coupling of coupling element 16 and screw insert 116 (thread segments 28, 126 (cf. FIGS. 2 and 3).

The embodiment of the probe lever 6 described below (according to FIGS. 9 to 11) has differences—in relation to the above-described probe lever 6 (according to FIGS. 1 to 4)—"only" with regard to the retention of the screw insert 16 in the coupling arm/measuring shaft 80 and the axial planar abutment of the axial planar abutment surface 36 of the coupling element 16.

Owing to the substantial correspondence of the two embodiments, the description of identical elements in both embodiments will be omitted for the sake of simplicity here (below)—and, in this regard, reference will be made to the statements relating to the embodiment described above (as per FIGS. 1 to 4). In particular, identical parts/components and functions are denoted by the same reference designations in the drawing figures.

As shown in particular in FIGS. 9 and 10, the alternative screw insert 116 provides on the screw insert 116—there at the other end of the recess 124 that bears the thread segments 126 or the internal thread components 128—a bore 152 which forms the second connecting/coupling region 120 and which has an inserted (hexagonal socket) screw 122.

By means of this (hexagonal socket) screw 122—and its external thread 134—the screw insert 116 is screwed into the coupling arm 80 (into the internal thread 88 thereof) (cf. FIGS. 9 and 10).

Furthermore, as is also shown in FIGS. 9 and 10, the end at the other side of the screw insert 116, which end has the bore 152 and the screw 122, forms a radially extending abutment surface 136 for the axial abutment against the counterpart surface 144 on the coupling arm 80.

Furthermore, here, the screw insert 116 provides a substantially cylindrical subsection 138 for radial centering in the coupling arm 80.

As is also illustrated by FIGS. 9 and 10, the radially extending abutment surface 36, which is directed in the direction of the journal (24a) that bears the thread segments 28 or the external thread components 30, of the radially outwardly extending flange-like projection 42 of the coupling element 16 is supported here on a counterpart surface 44 on the screw insert 116 (planar abutment—see above) (cf. according to the embodiment as per FIGS. 1 to 4, this planar abutment 36/44 took place between coupling element 16 and coupling arm 80).

(Further) planar abutment between screw insert 116 and coupling arm 80 then takes place, as shown in FIGS. 9 and 10, via a planar abutment surface 156 on the screw insert 116 and a counterpart surface 154 on the coupling arm 80.

In short, and in descriptive terms, where, according to the embodiment of the probe lever 6 as per FIGS. 1 to 4, the planar abutment takes place by means of a flange-like structure 158—provided integrally on the coupling arm 80—between coupling element 16 and coupling arm 80 (cf. planar abutment 44/36 as per FIG. 4), it is the case in the embodiment of the probe lever 6 as per FIGS. 9 to 11 that this flange-like structure 158 is formed integrally on the screw insert 116, whereby, firstly, first planar abutment 44/36 occurs between coupling element 16 and screw insert 116 and, secondly, second planar abutment 154/156 occurs between screw insert 116 and coupling arm 80.

Here, too, it is thus possible by means of these simple structural elements on the screw insert 116 for the screw insert 116 to be received and held securely in the coupling arm/measuring shaft 80 in a simple manner.

Regardless of above-described exemplary embodiments, in particular those according to FIGS. 1 to 4, FIGS. 7 to 8 and FIGS. 9 to 11, respectively, elements of an exemplary embodiment may be combined with elements of another exemplary embodiment.

For example, the screw insert 116 with separate screw 122 (as per the embodiment according to FIGS. 9 to 11) and abutment surfaces 44/36 (as per the embodiment according to FIG. 4) may be combined with one another in the case of a further probe lever 6 of a 3D probe 2.

In the case of this combined embodiment, the screw insert 116 may also wobble somewhat if the screw 112 is not fully tightened, such that the centering of the coupling arm 116 is not influenced.

Although the invention has been illustrated and described in more detail using the preferred exemplary embodiments, the invention is not restricted by the disclosed examples and other variations can be derived therefrom without de-parting from the scope of protection of the invention.

The following is a summary list of reference numerals and the corresponding structure used in the above description of the invention:

2 Probe measuring apparatus, 3D probe
4 Housing
6 Probe lever, probe arm
8 Probe insert, probe tip
10 Probe ball (probe reference point) (welded to steel pin 12)
12 (Steel) pin (adhesively bonded in ceramic sleeve 14)
14 (Ceramic) sleeve (screwed and adhesively bonded in coupling element 16)
16 Coupling element (for quick-action coupling probe insert 8—coupling arm/measuring shaft 80, coupled to screw insert 36)
18 First connecting/coupling region, first screw region (coupling to screw insert 116)
20 Second connecting/coupling region, second screw region (connection to probe insert/probe tip 8 or ceramic sleeve 14)
(24a) (Threaded) journal (at one end) (thread segments 28 thereon)
24b Further (threaded) journal (at the other end) (with recess (26b) for sleeve 14)
(26a) Further recess (in the first connecting region 18 for internal thread 34 for screw connection to previous threaded rod)
(26b) Recess (in the second connecting region 20 for sleeve 14)
28 Thread segment (on the journal (24a) for (quick-action) coupling to screw insert 36)
30 Depression, partial thread turn, external thread component (in the thread segment 28)
32 Discontinuity, recess (between thread segments 28)
34 Internal thread (in recess (26a) in the journal (24a) for screw connection to previous threaded rod)
36 Abutment surface for axial planar abutment (axial planar abutment surface)
38 Substantially cylindrical subsection (for radial centering)
40 Bead
42 Flange-like projection (with planar abutment)
44 Counterpart surface (on coupling arm 80/on screw insert 116 for planar abutment surface 36)
46 Fluting
48 Fluting
50 Region (of the non-circular structure) situated radially further to the inside
52 Region (of the non-circular structure) situated radially further to the outside 54 Circular arc
56 Chord
60 Outer surface (of the journal (24a)
62 Radial circumferential direction
68 Pitch profile
70 Inner surface (in recess 124)
80 Coupling arm, measuring shaft
82 Measuring axis
84 Direction of probe tip
86 Universal/ball joint
88 Internal thread
90 Recess (in the coupling arm 80 for coupling element 16 and screw insert 116)
92 Inner surface (in recess 90 (with non-circular structure)
94 (Detent engagement) structure
96 Radially encircling groove
116 Screw insert (for quick-action coupling probe insert 8—coupling arm/measuring shaft 80, coupled to coupling element 16)
118 First connecting/coupling region, first screw region (coupling to coupling element 16)
120 Second connecting/coupling region, second screw region (connection to coupling arm/measuring shaft 80)
External thread (for screw connection to coupling arm/measuring shaft 80)
122 (Threaded) journal or screw (with external thread 134 for screw connection to/in the coupling arm/measuring shaft 80)
124 Recess (at/in the first connecting region 118 for thread segments 126)
126 Thread segment (for (quick-action) coupling to coupling element 16)
128 Depression, partial thread turn, internal thread component (in the thread segment 126)
130 Discontinuity, recess (between thread segments 126)
132 Reduced-diameter intermediate region (between the first and the second connecting/coupling region 118, 120 (flexibility)
134 External thread
136 Abutment surface for axial abutment (axial abutment surface)
138 Substantially cylindrical subsection (for radial centering)
140 Outer surface (of the journal 122 or of the screw 122)
142 Flange-like projection (with abutment), abutment
144 Counterpart surface (on the coupling arm 80 for abutment surface 136)
146 Outer surface of the screw insert 116 in the region of the first connecting/coupling region
148 Radially resilient structure
150 Spring clamp elements
152 Bore
154 Counterpart surface (on the coupling arm 80 for planar abutment surface 156)
156 Abutment surface (on screw insert 116 for axial planar abutment (axial planar abutment surface)
216 Coupling assembly, rotary coupling
F-F Section

The invention claimed is:

1. A coupling element for receiving a probe tip in a probe measuring apparatus, the coupling element comprising:
a journal having a first connecting and coupling region formed at an end thereof; and
said journal having an outer surface formed with a plurality of thread segments which do not adjoin one another in a radial circumferential direction.

2. The coupling element according to claim 1, wherein each of said thread segments is formed by one or more depressions each forming a partial thread turn, and wherein pitch profiles are identical in all depressions that form said partial thread turns.

3. The coupling element according to claim 2, wherein the identical pitch profiles are in each case constant, or the identical pitch profiles change degressively.

4. The coupling element according to claim 2, wherein said depressions forming said partial thread turns do not form a common thread turn.

5. The coupling element according to claim 2, wherein gaps are formed between said partial thread turns of a thread segment.

6. The coupling element according to claim 1, wherein at least two or more of said thread segments are of identical form.

7. The coupling element according to claim 1, wherein three said thread segments are distributed uniformly in the radial circumferential direction on the outer surface of said journal.

8. The coupling element according to claim 1, wherein a recess which has an internal thread is provided in said first connecting and coupling region of said journal.

9. The coupling element according to claim 1, wherein said journal is a first journal and the coupling element further comprises a second journal having another end forming a second connecting and coupling region and being formed with a further recess.

10. The coupling element according to claim 1, further comprising a radially extending abutment surface for axial planar abutment.

11. The coupling element according to claim 1, which comprises a substantially cylindrical subsection, formed with an outwardly building bead formed on an outer surface thereof, running at least partially or fully in encircling fashion in a radial circumferential direction, for radial centering.

12. The coupling element according to claim 1, which comprises a subsection, having an outer circumference that is non-circular in cross section, is formed by regions that are situated radially further inside and radially further outside.

13. A coupling element for a probe tip of a probe measuring apparatus, the coupling element comprising:
a journal having a first connecting and coupling region formed at an end thereof; and
said journal having an outer surface and being formed with a multi-turn external thread on said outer surface.

14. A screw insert for receiving a probe tip in a probe measuring apparatus, the screw insert comprising:
a first connecting and coupling region formed at one end and configured for connecting to a coupling element according to claim 1;
said first connecting and coupling region having a recess with an inner surface and multiple thread segments formed on said inner surface that do not adjoin one another in a radial circumferential direction.

15. The screw insert according to claim 14, wherein each of said thread segments is formed by one or more depressions which form in each case a partial thread turn, and wherein pitch profiles are identical in all of said depressions that form said partial thread turns.

16. The screw insert according to claim 15, wherein the identical pitch profiles are in each case constant, or the identical pitch profiles change degressively.

17. The screw insert according to claim 15, wherein said depressions that form the partial thread turns do not form a common thread turn.

18. The screw insert according to claim 15, wherein gaps are formed between the partial thread turns of a thread segment.

19. The screw insert according to claim 14, wherein at least two or more of said thread segments are of identical form.

20. The screw insert according to claim 14, wherein three said thread segments are distributed uniformly in the radial circumferential direction on the inner surface of said recess.

21. The screw insert according to claim 14, which comprises a journal forming a second connecting and coupling region at another end, on the outer surface of which there is formed an external thread or a bore which, at the other end, forms a second connecting and coupling region and which has an inserted screw.

22. The screw insert according to claim 21, which comprises a cylindrical intermediate region between said first and second connecting and coupling regions.

23. The screw insert according to claim 14, which comprises a radially extending abutment surface for axial planar abutment.

24. The screw insert according to claim 14, which comprises a substantially cylindrical subsection for radial centering.

25. The screw insert according to claim 14, which comprises a radially resilient structure on an outer surface of the screw insert, in a region of said first connecting and coupling region.

26. A coupling assembly, comprising a coupling element according to claim 1 and a screw insert according to claim 14.

27. The coupling assembly according to claim 26, wherein the thread segments of the coupling element and the thread segments of the screw insert are mutually corresponding internal and external threads, respectively, that can be screwed to one another.

28. A probe measuring apparatus, comprising:
 a screw insert according to claim 14;
 a coupling arm and measuring shaft connected to said screw insert;
 said screw insert and said coupling arm and measuring shaft being screwed to one another or being formed as a single piece.

29. A probe measuring apparatus being a 3D probe, comprising:
 a coupling element according to claim 1;
 a screw insert according to claim 14;
 a coupling arm and measuring shaft; and
 a probe insert with a probe ball, a pin and a sleeve, said probe insert 8 being connected to said coupling arm and measuring shaft by way of said coupling element and by way of said screw insert connected to said coupling element.

30. The probe measuring apparatus according to claim 29, wherein the thread segments of said coupling element 16 and the thread segments of said screw insert are formed as corresponding internal and external threads configured to be screwed to one another.

* * * * *